United States Patent Office
3,281,431
Patented Oct. 25, 1966

3,281,431
17-OXYGENATED-2-THIA-5α-ANDROSTANES AND DERIVATIVES THEREOF
Paul B. Sollman, Wilmette, Ill., assignor to G. D. Searle & Co., Chicago, Ill., a corporation of Delaware
No Drawing. Filed Sept. 28, 1964, Ser. No. 399,897
14 Claims. (Cl. 260—327)

The present invention relates to novel steroidal derivatives possessing a heterocyclic sulfur atom and, more particularly, to 17-oxygenated-2-thia-5α-androstanes and derivatives thereof which are encompassed by the following structural formula

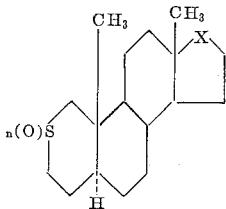

In that representation, X is symbolic of a carbonyl, β-hydroxymethylene, β-(lower alkanoyl)oxymethylene, or α-(lower alkyl)-β-hydroxymethylene radical, and $n$ is an integer from 0 to 2 inclusive.

The lower alkyl radicals encompassed by the X term are exemplified by methyl, ethyl, propyl, butyl, pentyl, hexyl, and the branched-chain isomers thereof, while the lower alkanoyl radicals designated in that term are typified by acetyl, propionyl, butyryl, valeryl, caproyl, and the branched-chain groups isomeric therewith.

The instant compounds are conveniently obtained by utilizing as starting materials compounds of the following structural formula

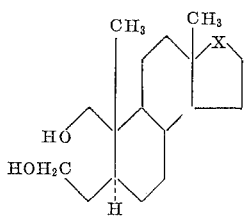

wherein X is as hereinbefore defined. Those seco-1,2-diols are converted to the corresponding sulfonate esters, e.g., by reaction with methanesulfonyl chloride, preferably in the presence of a suitable acid acceptor. In that manner, 17α-methyl-1,2-seco-A-nor-5α - androstane-1,2,17β - triol, for example, is allowed to react at 0–5° with methanesulfonyl chloride in pyridine to afford 1,2-bis-methanesulfonyloxy-17α-methyl-1,2-seco - A - nor-5α - androstan-17β-ol. Reaction of those bis-sulfonyl esters with sodium hydrosulfide in a suitable organic solvent affords the instant 2-thia derivatives. The aforementioned 1,2-bis-methanesulfonyloxy-17α - methyl-1,2-seco-A-nor-5α-androstan-17β-ol is thus heated at the reflux temperature with an ethylene glycol monoethyl ether-sodium hydrosulfide solution to afford 17α-methyl-2-thia-5α-androstan-17β-ol.

An alternate route to the instant 2-thia compounds involves the use of starting materials of the structural formula

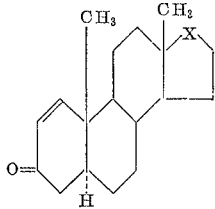

Cleavage of the double bond of the latter substances is effected by ozonolysis, thus producing the corresponding 1-oxo-1,2-seco-A-nor-5α-androstan-2-oic acids. Esterification of the carboxyl group with a lower alkanol followed by reaction of the resulting aldehydo-ester with an appropriate mercaptan such as benzyl mercaptan, affords the corresponding mercaptol. Saponification of the ester group followed by reductive cleavage of the mercaptol function affords the intermediate 1-mercapto-1,2-seco-A-nor-5α-androstan-2-oic acids. The latter substances can be converted directly, by chemical reduction to the corresponding 1-mercapto-2-ols or, alternatively, through the intermediate 2-thia-3-ones to the latter substances. Thus, 17β - hydroxy-1-mercapto-1,2-seco-A-nor-5α-androstan-2-oic acid, as a specific example, is heated at the reflux temperature with lithium aluminum hydride in tetrahydrofuran to afford 1-mercapto-1,2-seco-A-nor-5α-androstane-2,17β-diol or is, alternatively, converted to 17β-hydroxy-2-thia-5α-androstan-3-one by heating in an inert organic solvent or by reacting in an acidic dehydrating medium, and the latter thiolactone is reduced to the aforementioned 1-mercapto-1,2-seco-A-nor-5α - androstane - 2,17β - diol by heating with lithium aluminum hydride in tetrahydrofuran. Dehydration of those 1-mercapto-2-ols, suitably by heating with an acidic catalyst, affords the instant 2-thia derivatives. Illustrative of that process is the reaction of the aforementioned 1-mercapto-1,2-seco-A-nor-5α-androstane-2,17β-diol with p-toluenesulfonic acid in toluene at the reflux temperature to produce 2-thia-5α-androstan-17β-ol.

Oxidation of the sulfur atom of the instant 2-thia compounds with a limited quantity of reagent affords the corresponding sulfoxides. These sulfoxides can exist in either of two stereoisomeric forms in consequence of the tetrahedral configuration of the sulfur atom. The respective isomers are designated "α" and "β" to indicate their spatial relationship to the plane of the sulfur-containing ring. In the conduct of this invention, it has been found that the "α" isomer predominates in the mixture obtained by oxidation of the 2-thia precursor. Thus, 2-thia-5α-androstan-17β-ol is contacted with perbenzoic acid in benzene to yield a mixture of the corresponding 2α and 2β epimeric oxides which can be separated by chromatography. Interconversion of the epimeric oxides can be effected by reaction with hydrochloric acid in a suitable solvent medium such as dioxane. Reaction of the instant 2-thia substances with two equivalents of the oxidant, on the other hand, produces the instant sulfones. 17α-methyl-2-thia-5α-androstan-17β-ol, for example, is contacted with two equivalents of meta-chloroperbenzoic acid in benzene to afford the corresponding 2,2-dioxide.

In the structural formulas representing the instant sulfoxides and sulfones, the sulfur to oxygen linkage, for the sake of convenience, is designated as a double bond. That representation is not to be considered as limiting in any way, however, as those persons skilled in the art will recognize that the precise nature of that bond is uncertain and that those compounds most probably consist of resonance hybrids containing double bonds and coordinate bonds.

Equivalent to the instant 2-thia compounds for the purposes of this invention are the corresponding (lower alkyl)-sulfonium salts such as the methiodide, methochloride, methobromide, methosulfate, ethiodide, ethosulfate, etc. These sulfonium salts can be prepared in the conventional manner, utilizing reaction temperatures of 0–30°. A convenient process is exemplified by the reaction of 17α-methyl-2-thia-5α-androstan-17β-ol with methyl iodide at room temperature to produce 2,17α-dimethyl-2-thia-5α-androstan-17β-ol iodide.

Esterification of the instant 17β-ols with a lower alkanoic acid anhydride or halide, preferably in the presence of a suitable acid acceptor such as pyridine, triethylamine, etc., results in the corresponding 17-(lower alkanoates). Illustrative of that process is the reaction of 2-thia-5α-androstan-17β-ol with acetic anhydride and pyridine at room temperature to afford 2-thia-5α-androstan-17β-ol 17-acetate.

The compounds of this invention are useful in view of their valuable pharmacological properties. They are hormonal agents, for example, as evidenced by their anabolic and androgenic properties. In addition, they display hypotensive, hypocholesterolemic, autonomic ganglion-blocking, pepsin-inhibitory, and anti-ulcerogenic activity. These compounds are, furthermore, anti-bacterial, anti-protozoal, anti-fungal, and anti-algal agents as is apparent from their ability to inhibit the growth of such organisms as *Diplococcus pneumoniae, Tetrahymena gellei, Candida albicans, Chlorella vulgaris,* and *Trichophyton mentagrophytes.* They are able also to inhibit dicotyledenous seed germination.

The invention will appear more fully from the examples which follow. These examples are set forth by way of illustration only, and it will be understood that the invention is not to be construed as limited either in spirit or in scope by the details contained therein, as many modifications in materials and methods will be apparent from this disclosure to those skilled in the art. In these examples, temperatures are given in degrees centigrade (° C.). Quantities of materials are expressed in parts by weight except where otherwise noted. Nuclear magnetic resonance spectra were obtained on deuterochloroform solutions and are reported in cycles per second downfield from tetramethylsilane, used as the internal standard.

EXAMPLE 1

A stream of oxygen containing 6% of ozone is passed through a solution of 145 parts of 17β-hydroxy-5α-androst-1-en-3-one in 704 parts of methanol containing 603 parts of methylene chloride for about 4¼ hours at −70°, after which time a solution of 120 parts of sodium hydroxide in 500 parts of water is added. The resulting two-phase system is stirred for about 16 hours, during which time the mixture is allowed to warm to room temperature. The two layers are separated, and the aqueous layer is extracted with methylene chloride, then is distilled in order to free that aqueous solution of methanol. Acidification of the aqueous solution with concentrated hydrochloric acid to a pH of 1–2 results in precipitation of 17β-hydroxy - 1 - oxo - 1,2-seco-A-nor-5α-androstan-2-oic acid, which is collected by filtration and dried. That crude material, suitable for use in the following reaction, melts at about 183–190°. Recrystallization from aqueous methanol affords a pure sample, displaying a melting point of about 190–194°.

A mixture of 20 parts of 17β-hydroxy-1-oxo-1,2-seco-A-nor-5α-androstan-2-oic acid, 200 parts of methanol and 1.5 parts of p-toluenesulfonic acid monohydrate is stored at room temperature for about 18 hours, then is diluted with water and extracted with ether. The ether layer is separated, washed with saturated aqueous sodium bicarbonate, then concentrated to dryness to afford an oily residue. When that residue is crystallized from ether-hexane, methyl 17β-hydroxy-1-oxo-1,2-seco-A-nor-5α-androstan-2-oate is obtained as a solvate, melting at 78–80°. Drying of that material at about 100° under high vacuum affords the unsolvated material as a glass. It displays infrared absorption maxima at about 2.72, 5.77, 6.90, and 8.5 microns.

To a solution of 7 parts of methyl 17β-hydroxy-1-oxo-1,2-seco-A-nor-5α-androstan-2-oate in 26.3 parts of acetic acid is added successively 10.6 parts of benzyl mercaptan and 0.1 part of p-toluenesulfonic acid monohydrate. That reaction mixture is kept at room temperature for about 18 hours, after which time it is diluted with ether, and washed successively with saturated aqueous sodium bicarbonate, 10% aqueous sodium hydroxide, and water. The organic layer is dried over anhydrous sodium sulfate, then is concentrated to dryness at reduced pressure to afford methyl 1,1-bisbenzylthio-17β-hydroxy-1,2-seco-A-nor-5α-androstan-2-oate as an oil.

To that oily ester is added 104 parts of methanol and 65 parts by volume of 10% aqueous sodium hydroxide, and the resulting reaction mixture is heated at the reflux temperature for about 5 hours. Dilution with water results in separation of the crude sodium salt as a gummy precipitate. That precipitate is dissolved in methanol, and the resulting solution is diluted with ether, then is acidified with acetic acid. The addition of solid sodium chloride to that solution effects precipitation of the crude acid, which is collected by filtration, then is recrystallized by dissolution in methanol followed by dilution with aqueous sodium chloride. The pure 1,1-bisbenzylthio-17β-hydroxy-1,2-seco-A-nor-5α-androstan-2-oic acid thus obtained melts at about 105–110° and is characterized further by infrared absorption maxima at about 2.76, 5.85, 6.88, and 7.70 microns.

A solution of 6.8 parts of 1,1-bisbenzylthio-17β-hydroxy-1,2-seco-A-nor-5α-androstan-2-oic acid in 32 parts of ethanol is added to 315 parts of liquid ammonia, and that solution is stirred while 2.5 parts of lithium metal is added portionwise over a period of about 30 minutes. After the addition has been completed, the ammonia is distilled by means of a stream of nitrogen, and the residue which remains is dissolved in water. That aqueous solution is extracted with ether, then is cooled by the addition of ice and acidified by means of concentrated hydrochloric acid. The precipitate which separates is collected by filtration, then is recrystallized from aqueous acetone to afford pure 17β-hydroxy-1-mercapto-1,2-seco-A-nor-5α-androstan-2-oic acid, melting at about 195–204° with decomposition. A potassium bromide disc of this material exhibits maxima in its infrared absorption spectrum at about 2.95, 3.40, 3.85, 5.88, 6.90, 9.45, and 9.81 microns.

EXAMPLE 2

*Method A.*—A solution of 2 parts of 17β-hydroxy-1-mercapto-1,2-seco-A-nor-5α-androstan-2-oic acid in 174 parts of toluene is heated at the reflux temperature for about 24 hours, then is cooled and washed with saturated aqueous sodium bicarbonate. The organic layer is concentrated to dryness at reduced pressure, and the resulting residue is crystallized from aqueous acetone to afford 17β-hydroxy-2-thia-5α-androstan-3-one, melting at about 162–164°. It is characterized further by an ultraviolet absorption maximum at about 238.5 millimicrons with a molecular extinction coefficient of about 4000. Infrared absorption maxima in a potassium bromide disc are observed at about 3.0, 5.96, 8.72, 8.98, and 9.30 microns.

*Method B.*—A solution of one part of 17β-hydroxy-1-mercapto-1,2-seco-A-nor-5α-androstan-2-oic acid in 45 parts of chloroform containing 0.3 part by volume of 30% hydrogen bromide in acetic acid is kept at room temperature for about 2 hours, then is washed with aqueous sodium bicarbonate and concentrated to dryness at reduced pressure. Crystallization of the resulting residue from aqueous acetone affords pure 17β-hydroxy-2-thia-5α-androstan-3-one, melting at about 162–164° and identical with the product of Method A.

*Method C.*—A mixture of 1.3 parts of 17β-hydroxy-1-mercapto-1,2-seco-A-nor-5α-androstan-2-oic acid, 45 parts of chloroform and 0.5 part of p-toluenesulfonic acid monohydrate is stirred at room temperature for about 30 minutes, then is washed with aqueous sodium bicarbonate. Removal of the solvent by distillation at reduced pressure affords a residue which is recrystallized from aqueous acetone to yield pure 17β-hydroxy-2-thia-5α-androstan-3-one, identical with the product of Methods A and B.

EXAMPLE 3

To a solution of 32 parts of 17α-methyl-1,2-seco-A-nor-5α-androstane-1,2,17β-triol in 600 parts of pyridine at 0–5°, is added dropwise with stirring a cold solution of 30 parts of methanesulfonyl chloride in 100 parts of pyridine. After the addition is complete, the reaction mixture is stored at that temperature for about 22 hours, then is filtered, and the filtrate is diluted with approximately 16,000 parts of water. The product is then "salted out" by the addition of approximately 1800 parts of sodium chloride, and the resulting precipitate is collected by filtration, and recrystallized first from aqueous acetone, then from benzene-hexane to afford pure 1,2 - bis-methanesulfonyloxy - 17α - methyl - 1,2 - seco-A-nor-5α-androstan-17β-ol, melting at about 143–144°. In chloroform, its infrared absorption spectrum displays peaks at about 2.75, 7.35, 8.51, 10.30, and 10.50 microns. Nuclear magnetic resonance maxima are observed at about 45, 50, 72, 87, 178, 181, and 250 cycles per second. This compound is characterized further by the following structural formula

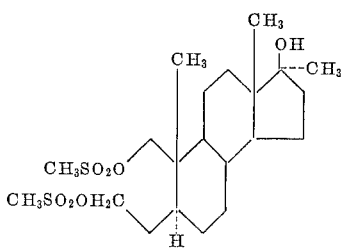

EXAMPLE 4

*Method A.*—A mixture of 1.25 parts of 17β-hydroxy-2-thia-5α-androstan-3-one, 0.5 part of lithium aluminum hydride, and 45 parts of tetrahydrofuran is heated at the reflux temperature for about 8 hours, then is stored at room temperature for about 16 hours. The excess reagent is destroyed by the addition of a small quantity of ethyl acetate, and the reaction mixture is then partitioned between ether and water. The ether layer is separated and concentrated to dryness under reduced pressure to afford a residue which is crystallized from ether-hexane, thus affording solvated crystals of 1-mercapto-1,2-seco-A-nor-5α-androstane-2,17β-diol, melting at about 70–73°. Its infrared absorption spectrum displays prominent peaks at about 2.98, 6.91, and 9.48 microns, while its nuclear magnetic resonance spectrum exhibits maxima at about 43, 47, 85, 110, 153, 161, and 219 cycles per second. This compound is represented by the following structural formula.

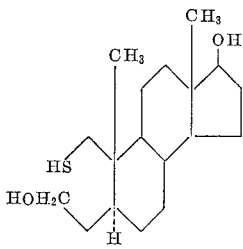

*Method B.*—A mixture containing 8.3 parts of 17β-hydroxy - 1 - mercapto - 1,2-seco-A-nor-5α-androstan-2-oic acid, 450 parts of tetrahydrofuran, and 2.5 parts of lithium aluminum hydride is heated at the reflux temperature for about 6 hours, then is cooled, and a small quantity of ethyl acetate is added in order to destroy the excess reagent. Dilution with a saturated aqueous solution of sodium potassium tartrate results in separation of the mixture into two layers, and the top layer is separated, then concentrated to a small volume by distillation under reduced pressure. The resulting residue is partitioned between water and ether, and the ether layer is concentrated to dryness to afford a solid residue. Recrystallization from ether-hexane affords pure 1-mercapto-1,2-seco-A-nor-5α-androstane-2,17β - diol, identical with the product of Method A.

EXAMPLE 5

To a solution of 1.07 parts of 1-mercapto-1,2-seco-A-nor-5α-androstane-2,17β-diol in 174 parts of toluene is added 0.45 part of p-toluenesulfonic acid monohydrate, and the resulting reaction mixture is heated at the reflux temperature for about 5 hours. The mixture is then cooled, washed with aqueous sodium bicarbonate and concentrated to dryness under reduced pressure to afford a fluffy, white, crystalline solid. Successive recrystallizations from ether-hexane and aqueous acetone results in crystalline solvated 2-thia-5α-androstan-17β-ol, melting at about 180–182°. The unsolvated material, melting at about 178–182°, is obtained by sublimation. The infrared absorption spectrum, in a potassium bromide disc, of this compound is characterized by prominent peaks at about 3.01, 6.89, and 9.41 microns. Nuclear magnetic resonance spectral maxima are observed at about 45, 64, 92, 147, and 218 cycles per second. This compound is represented by the following structural formula

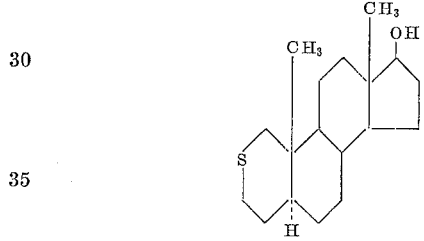

EXAMPLE 6

To a solution of 2.51 parts of 2-thia-5α-androstan-17β-ol in 880 parts of benzene is added 70 parts by volume of a 0.123 molar solution of perbenzoic acid in benzene. After about 2 hours, the reaction mixture is washed successively with aqueous sodium bicarbonate and water, then is dried over anhydrous sodium sulfate and concentrated to dryness under reduced pressure. Crystallization of the resulting residue from acetone-hexane results in 2-thia-5α-androstan-17β-ol 2α-oxide, melting at about 262–263°. In chloroform, its infrared absorption spectrum exhibits peaks at about 2.72, 8.00, and 9.73 microns. Nuclear magnetic resonance maxima are observed at about 45, 59, and 128 cycles per second with a multiplet centered at about 210 cycles per second. A structural representation of this compound is shown below:

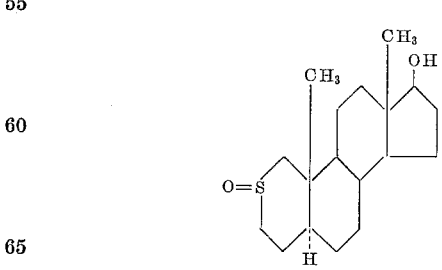

EXAMPLE 7

A solution of 0.75 part of 2-thia-5α-androstan-17β-ol 2α-oxide in 100 parts of dioxane containing 60 parts of concentrated hydrochloric acid is kept at room temperature for about 20 hours, then is cooled by the addition of ice and made alkaline by the addition of dilute aqueous sodium hydroxide. Extraction of the resulting alkaline mixture with methylene chloride followed by removal of the solvent by distillation under reduced pressure affords the crude product. That crude solid is purified by dissolution in ethyl acetate, adsorption on a silica gel chromatographic column and elution with 10% acetone in ethyl acetate, thus producing 2-thia-5α-androstan-17β-ol 2β-oxide, which is recrystallized from acetone-hexane to afford the pure material, melting at about 236–237°. Infrared absorption maxima, in chloroform, are observed at about 2.72, 7.98, 9.44, and 9.78 microns. Nuclear magnetic resonance spectral peaks are displayed at about 45, 80, and 122 cycles per second. In addition, multiplets are observed between 130 and 230 cycles per second. This compound is characterized further by the following structural formula

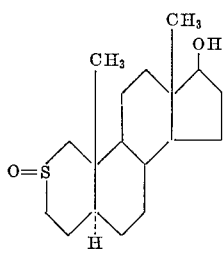

EXAMPLE 8

A solution containing 5.1 parts of 2-thia-5α-androstan-17β-ol, 47.5 parts of cyclohexanone and 6.3 parts of aluminum isopropoxide in 435 parts of toluene is heated at the reflux temperature for about 1½ hours, then is cooled and diluted with approximately 100 parts by volume of saturated aqueous sodium potassium tartrate. Steam distillation of that mixture affords a residual aqueous suspension which is extracted with ether. Removal of the ether by distillation under reduced pressure affords a residue which is adsorbed on a silica gel chromatographic column, then eluated with 2% ethyl acetate in benzene, thus producing 2-thia-5α-androstan-17-one, melting at about 162–164°. Prominent infrared absorption peaks, in chloroform, are observed at about 3.40 and 5.74 microns. This compound displays also nuclear magnetic resonance maxima at about 51, 64, and 146 cycles per second and is further characterized by the following structural formula

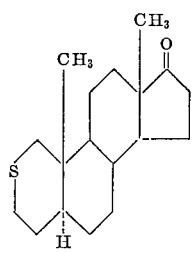

EXAMPLE 9

A solution of sodium hydrosulfide is prepared by bubbling hydrogen sulfide into a suspension of 9 parts of sodium methoxide in 170 parts of ethylene glycol monoethyl ether until the exothermic reaction ceases. The resulting mixture is filtered, and one part of 1,2-bis-methanesulfonyloxy - 17α - methyl-1,2-seco-A-nor-5α-androstan-17β-ol is added to 20 parts by volume of the foregoing sodium hydrosulfide solution. The resulting reaction mixture is heated at the reflux temperature for about 20 minutes, then is diluted with water. The product which precipitates is collected by filtration and dried, thus affording pure 17α-methyl-2-thia-5α-androstan-17β-ol, melting at about 204–206°. This compound displays infrared absorption maxima, in a potassium bromide disc, at about 2.82, 6.88, 7.24, and 10.67 microns, and nuclear magnetic resonance peaks at about 50, 63, and 72 cycles per second. It is characterized further by the following structural formula

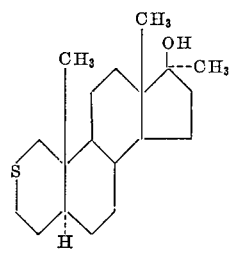

EXAMPLE 10

A solution of 2.8 parts of 17α-methyl-2-thia-5α-androstan-17β-ol in 160 parts of methyl iodide is allowed to stand at room temperature for about 5 hours, and the crystalline product which forms is collected by filtration to yield 2,17α - dimethyl - 2 - thia - 5α-androstan-17β-ol iodide, melting at about 205–207°, with decomposition. Recrystallization from methanol-ether affords the pure substance, melting at about 207–208°. Infrared absorption maxima, in a potassium bromide disc, are observed at about 2.91, 6.86, 7.50, 10.36, and 10.66 microns. A structural representation of this compound is shown below:

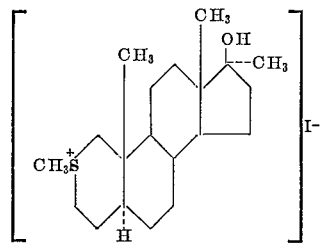

EXAMPLE 11

*Method A*.—To a solution of 4 parts of 17α-methyl-2-thia-5α-androstan-17β-ol in 220 parts of benzene is added 110 parts by volume of a 0.12 molar perbenzoic acid solution in benzene over a period of about 5 minutes. After storage at room temperature for about 5 hours, the reaction mixture is washed successively with saturated aqueous sodium bicarbonate and water, then is dried over anhydrous sodium sulfate and concentrated to dryness under reduced pressure. The resulting crude product is purified by successive recrystallizations from chloroform-pentane, acetone-hexane, and aqueous acetone to yield pure 17α - methyl - 2 - thia - 5α - androstan - 17β - ol 2α-oxide, melting at about 239–242°. A prominent infrared absorption maximum is observed, in chloroform, at about 9.71 microns, and nuclear magnetic resonance peaks are displayed at about 50, 58, and 72 cycles per second together with complex multiplets centered at about 130 and 205 cycles per second.

*Method B*.—A mixture of 3.1 parts of 17α-methyl-2-thia-5α-androstan-17β-ol, 2.2 parts of sodium meta-periodate, 100 parts of dioxane and 40 parts of water is stirred at room temperature for about 17 hours, then is filtered to remove the reduced reagent. Concentration of the filtrate to dryness affords the crude product, which is triturated with water, thus affording 17α-methyl-2-thia-5α-androstan-17β-ol 2α-oxide, identical with the product of Method A.

EXAMPLE 12

To a solution of 1.5 parts of 17α-methyl-2-thia-5α-androstan-17β-ol in 44 parts of benzene is added 2.2 parts of meta-chloroperbenzoic acid, and that reaction mixture is stored at room temperature for about one hour. At the end of that time, the reduced reagent is removed by filtration, and the filtrate is washed several times with saturated aqueous sodium bicarbonate in order to remove any residual acid. The benzene layer is then concentrated to dryness by distillation under reduced pressure, and the residual crude product is purified by successive crystallizations from aqueous acetone, benzene-hexane, and aqueous methanol. The resulting 17α-methyl-2-thia-5α-androstan-17β-ol 2,2-dioxide is characterized by a variable melting point, ranging between 198–202° and 210–215°. Infrared absorption peaks, in chloroform, are observed at about 2.72, 7.60, 8.76, 10.71, and 11.45 microns. Nuclear magnetic resonance maxima are displayed at about 51, 71, and 72 cycles per second with a complex multiplet centered at approximately 180 cycles per second. This compound is characterized further by the following structural formula

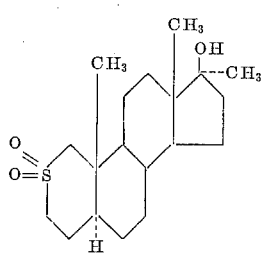

EXAMPLE 13

To a solution of 15 parts of 17α-ethyl-17β-hydroxy-2-oxa-5α-androstan-3-one in 1776 parts of tetrahydrofuran is added 15 parts of lithium aluminum hydride, and the reaction mixture is stirred at room temperature for about 16 hours, then is heated at the reflux temperature for about 2 hours. Cooling to approximately 0° followed by successive dilution with 16 parts of water, 12 parts by volume of 20% aqueous sodium hydroxide, and 56 parts of water results in precipitation of the inorganic salts which are removed by filtration. The filtrate is concentrated to dryness under reduced pressure, and the resulting residue is crystallized from benzene to afford 17α-ethyl-1,2-seco-A-nor-5α-androstane-1,2,17β-triol.

EXAMPLE 14

By substituting an equivalent quantity of 17α-ethyl-1,2-seco-A-nor-5α-androstane-1,2,17β-triol and otherwise utilizing these successive procedures of Example 3 and Example 9, there is obtained 17α-ethyl-2-thia-5α-androstan-17β-ol.

EXAMPLE 15

To a solution of 7.5 parts of 17α-methyl-2-thia-5α-androstan-17β-ol in 288 parts of benzene is added 91.5 parts by volume of 0.023 molar meta-chloro-perbenzoic acid in benzene. The reaction mixture is kept at 25–30° for about 15 minutes, then is successively extracted with 10% aqueous sodium hydroxide and water. The organic solution is dried over anhydrous sodium sulfate and evaporated to dryness under reduced pressure. Crystallization of the residue from aqueous acetone affords 17α-methyl-2-thia-5α-androstan-17β-ol 2α-oxide, melting at about 239–242°. The solid residue obtained from the mother liquor is adsorbed on a silica gel chromatographic column. Elution with 10% acetone in ethyl acetate affords pure 17α-methyl-2-thia-5α-androstan-17β-ol 2β-oxide, melting at about 225–230°, exhibiting infrared absorption maxima, in a potassium bromide disc, at about 2.95, 6.89, 7.17, 8.55, and 9.85 microns, and also nuclear magnetic resonance peaks at about 51, 72, and 80 cycles per second.

Further elution of the column with 20% acetone in ethyl acetate affords an additional quantity of pure 17α-methyl-2-thia-5α-androstan-17β-ol 2α-oxide.

EXAMPLE 16

When an equivalent quantity of 17α-ethyl-2-thia-5α-androstan-17β-ol is oxidized according to the procedure of Example 15, 17α-ethyl-2-thia-5α-androstan-17β-ol 2α-oxide and 17α-ethyl-2-thia-5α-androstan-17β-ol 2β-oxide are produced.

EXAMPLE 17

By substituting an equivalent quantity of 17α-ethyl-2-thia-5α-androstan-17β-ol and otherwise proceeding according to the processes described in Example 12, 17α-ethyl-2-thia-5α-androstan-17β-ol 2,2-dioxide is produced.

EXAMPLE 18

A mixture of 2.5 parts of 2-thia-5α-androstan-17β-ol, 80 parts of pyridine, and 40 parts of acetic anhydride is kept at room temperature for about 24 hours, then is diluted carefully with water. The resulting precipitate is collected by filtration, then recrystallized from aqueous acetone to afford pure 2-thia-5α-androstan-17β-ol 17-acetate, melting at about 150–152°, and further characterized by the following structural formula

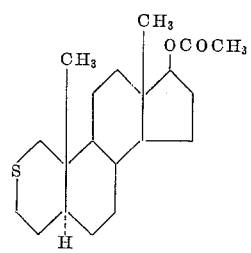

EXAMPLE 19

The reaction of one part of 2-thia-5α-androstan-17β-ol with 13 parts of propionic anhydride and 20 parts of pyridine according to the procedure described in Example 18 results in 2-thia-5α-androstan-17β-ol 17-propionate.

EXAMPLE 20

By substituting an equivalent quantity of 2-thia-5α-androstan-17β-ol 17-propionate and otherwise proceeding according to the processes described in Example 15, 2-thia-5α-androstan-17β-ol 2α-oxide 17-propionate and 2-thia-5α-androstan-17β-ol 2β-oxide 17-propionate are obtained.

EXAMPLE 21

A solution of 3 parts of 2-thia-5α-androstan-17β-ol and 96.5 parts of ethyl iodide in 300 parts of chloroform is heated at the reflux temperature for about 5 hours, then is stored at room temperature for about 26 days. At the end of that time, the reaction mixture is diluted with approximately 630 parts of ether, resulting in precipitation of an oil which crystallizes on standing. These crystals are extracted with water, and the aqueous solution is filtered, then concentrated to dryness under reduced pressure. Recrystallization of the resulting crude product from ethanol-ether results in 2-ethyl-2-thia-5α-androstan-17β-ol iodide, melting at about 144–148°. This sulfonium salt is quite soluble in water, is insoluble in ether, and yields a silver iodide precipitate when contacted with silver nitrate. It is further characterized by the following structural formula

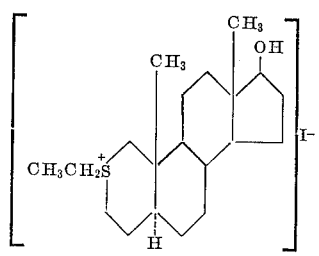

What is claimed is:
1. A member selected from the group consisting of compounds of the structural formula

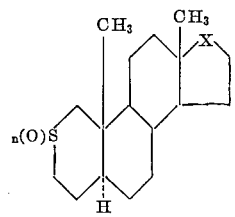

and the (lower alkyl)-sulfonium salts corresponding, wherein X is selected from the class consisting of carbonyl, β-hydroxymethylene, β-(lower alkanoyl)oxymethylene, and α-(lower alkyl)-β-hydroxymethylene radicals, and $n$ is an integer from 0 to 2 inclusive.

2. A compound of the structural formula

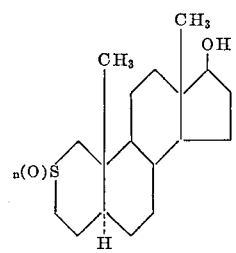

wherein $n$ is an integer from 0 to 2 inclusive.

3. A compound of the structural formula

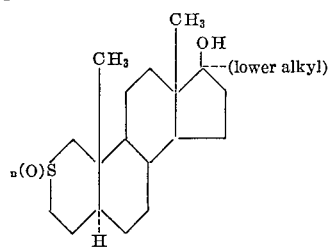

wherein $n$ is an integer from 0 to 2 inclusive.

4. 2-thia-5α-androstan-17β-ol.
5. 2-thia-5α-androstan-17β-ol 2α-oxide.
6. 2-thia-5α-androstan-17β-ol 2β-oxide.
7. 2-thia-5α-androstan-17-one.
8. 17α-methyl-2-thia-5α-androstan-17β-ol.
9. 2,17α-dimethyl-2-thia-5α-androstan-17β-ol iodide.
10. 17α-methyl-2-thia-5α-androstan-17β-ol 2α-oxide.
11. 17α-methyl-2-thia-5α-androstan-17β-ol 2,2-dioxide.
12. 2-thia-5α-androstan-17β-ol 17-acetate.
13. 17α-methyl-2-thia-5α-androstan-17β-ol 2β-oxide.
14. 2-ethyl-2-thia-5α-androstan-17β-ol iodide.

References Cited by the Examiner
UNITED STATES PATENTS
3,101,349   8/1963   Pappo et al. _____ 260—345.2

OTHER REFERENCES
Burger, Medicinal Chemistry, Interscience Publishers, Inc., New York, second edition (1960), pages 77 and 78.

WALTER A. MODANCE, *Primary Examiner.*
JAMES A. PATTEN, *Assistant Examiner.*